United States Patent
Rickards et al.

(10) Patent No.: US 10,432,469 B2
(45) Date of Patent: Oct. 1, 2019

(54) ACCESS CONTROLS THROUGH NODE-BASED EFFECTIVE POLICY IDENTIFIERS

(71) Applicant: Palantir Technologies Inc., Palo Alto, CA (US)

(72) Inventors: Neil Rickards, Hertfordshire (GB); James Baker, London (GB); Marco Gelmi, London (GB); Radu-Cosmin Balan, London (GB); Savino Sguera, London (GB)

(73) Assignee: Palantir Technologies, Inc., Palo Alto, CA (US)

( * ) Notice: Subject to any disclaimer, the term of this patent is extended or adjusted under 35 U.S.C. 154(b) by 0 days.

(21) Appl. No.: 16/009,120

(22) Filed: Jun. 14, 2018

(65) Prior Publication Data

US 2019/0007271 A1 Jan. 3, 2019

Related U.S. Application Data (63) Continuation of application No. 15/696,094, filed on Sep. 5, 2017, now Pat. No. 10,027,551.

(Continued)

(51) Int. Cl.
*G06F 15/16* (2006.01)
*H04L 12/24* (2006.01)
(Continued)

(52) U.S. Cl.
CPC .......... *H04L 41/0893* (2013.01); *G06F 21/00* (2013.01); *G06F 21/604* (2013.01);
(Continued)

(58) Field of Classification Search
CPC .................................................. H04L 65/608
(Continued)

(56) References Cited

U.S. PATENT DOCUMENTS

| 5,978,475 | A | 11/1999 | Schneier et al. |
| 6,725,240 | B1 | 4/2004 | Asad et al. |

(Continued)

FOREIGN PATENT DOCUMENTS

| CN | 101729531 | 6/2010 |
| CN | 103281301 | 9/2013 |

(Continued)

OTHER PUBLICATIONS

Official Communication for European Patent Application No. 14199180.2 dated Jun. 22, 2015.

(Continued)

*Primary Examiner* — Hamza N Algibhah
(74) *Attorney, Agent, or Firm* — Elliot H. Karlin; Hickman Palermo Becker Bingham LLP (57) ABSTRACT

Techniques for implementing a node-based access control system are described herein. In an embodiment, a server computer stores a node based policy system wherein each node identifies a resource and a policy for the resource. The server computer identifies a policy for a first node and an identifier of a second node wherein the second node is a parent node to the first node. The server computer maps an effective policy identifier to the policy for the first node and the identifier of the second node. The server computer stores data associating the effective policy identifier with the first node. The server computer identifies a policy for a third node and an identifier of the second node, wherein the second node is a parent node to the third node and wherein the policy for the third node is equivalent to the policy for the first node. The server computer then stores data associating the effective policy identifier with the third node.

18 Claims, 5 Drawing Sheets

Related U.S. Application Data (60) Provisional application No. 62/526,955, filed on Jun. 29, 2017.

(51) Int. Cl.
*H04L 29/08* (2006.01)
*H04L 29/06* (2006.01)
*G06F 21/00* (2013.01)
*G06F 21/60* (2013.01)
*G06F 21/62* (2013.01)

(52) U.S. Cl.
CPC ...... *G06F 21/6218* (2013.01); *G06F 21/6227* (2013.01); *H04L 41/12* (2013.01); *H04L 63/105* (2013.01); *H04L 65/608* (2013.01); *H04L 67/10* (2013.01); *G06F 2221/2141* (2013.01); *H04L 63/104* (2013.01)

(58) Field of Classification Search
USPC ......................................................... 709/225
See application file for complete search history.

(56) References Cited

U.S. PATENT DOCUMENTS

| | | | |
|---|---|---|---|
| 6,807,569 | B1 | 10/2004 | Bhimani et al. |
| 7,017,046 | B2 | 3/2006 | Doyle et al. |
| 7,069,586 | B1 | 6/2006 | Winneg et al. |
| 7,225,468 | B2 | 5/2007 | Waisman et al. |
| 7,596,285 | B2 | 9/2009 | Brown et al. |
| 7,770,032 | B2 | 8/2010 | Nesta et al. |
| 7,801,871 | B2 | 9/2010 | Gosnell |
| 7,962,495 | B2 | 6/2011 | Jain et al. |
| 8,181,253 | B1 | 5/2012 | Zaitsev et al. |
| 8,190,893 | B2 | 5/2012 | Benson et al. |
| 8,196,184 | B2 | 6/2012 | Amirov et al. |
| 8,239,668 | B1 | 8/2012 | Chen et al. |
| 8,301,904 | B1 | 10/2012 | Gryaznov |
| 8,312,546 | B2 | 11/2012 | Alme |
| 8,646,080 | B2 | 2/2014 | Williamson et al. |
| 8,683,322 | B1 | 3/2014 | Cooper |
| 8,726,379 | B1 | 5/2014 | Stiansen et al. |
| 8,769,412 | B2 | 7/2014 | Gill et al. |
| 8,782,794 | B2 | 7/2014 | Ramcharran |
| 8,931,043 | B2 | 1/2015 | Cooper et al. |
| 9,021,260 | B1 | 4/2015 | Falk et al. |
| 9,049,117 | B1 | 6/2015 | Nucci et al. |
| 9,100,428 | B1 | 8/2015 | Visbal |
| 9,335,897 | B2 | 5/2016 | Goldenberg |
| 9,338,013 | B2 | 5/2016 | Castellucci et al. |
| 9,888,039 | B2 | 2/2018 | Elliot et al. |
| 2002/0099952 | A1* | 7/2002 | Lambert ................. G06F 21/51 726/27 |
| 2002/0112157 | A1 | 8/2002 | Doyle et al. |
| 2003/0018786 | A1 | 1/2003 | Lortz |
| 2004/0010607 | A1 | 1/2004 | Lee et al. |
| 2004/0123139 | A1 | 6/2004 | Aiello et al. |
| 2004/0153418 | A1 | 8/2004 | Hanweck |
| 2004/0250124 | A1 | 12/2004 | Chesla et al. |
| 2005/0157662 | A1 | 7/2005 | Bingham et al. |
| 2005/0229256 | A2 | 10/2005 | Banzhof |
| 2005/0262556 | A1 | 11/2005 | Waisman et al. |
| 2005/0275638 | A1 | 12/2005 | Kolmykov-Zotov et al. |
| 2006/0031928 | A1 | 2/2006 | Conley et al. |
| 2006/0069912 | A1 | 3/2006 | Zheng et al. |
| 2006/0212931 | A1 | 9/2006 | Shull et al. |
| 2006/0218637 | A1 | 9/2006 | Thomas et al. |
| 2006/0265747 | A1 | 11/2006 | Judge |
| 2007/0143851 | A1 | 6/2007 | Nicodemus |
| 2007/0294766 | A1 | 12/2007 | Mir et al. |
| 2008/0104407 | A1 | 5/2008 | Horne et al. |
| 2008/0201580 | A1 | 8/2008 | Savitzky et al. |
| 2008/0222706 | A1 | 9/2008 | Renaud et al. |
| 2008/0229422 | A1 | 9/2008 | Hudis et al. |
| 2009/0103442 | A1 | 4/2009 | Douville |
| 2009/0119392 | A1 | 5/2009 | Bonjour et al. |
| 2009/0228701 | A1 | 9/2009 | Lin |
| 2009/0328222 | A1 | 12/2009 | Helman et al. |
| 2010/0077481 | A1 | 3/2010 | Polyakov et al. |
| 2010/0100963 | A1 | 4/2010 | Mahaffey |
| 2010/0235915 | A1 | 9/2010 | Memon et al. |
| 2010/0262688 | A1 | 10/2010 | Hussain et al. |
| 2010/0330801 | A1 | 12/2010 | Rouh |
| 2011/0060910 | A1 | 3/2011 | Gormish et al. |
| 2011/0202555 | A1 | 8/2011 | Cordover et al. |
| 2011/0219450 | A1 | 9/2011 | McDougal et al. |
| 2012/0079592 | A1 | 3/2012 | Pandrangi |
| 2012/0084866 | A1 | 4/2012 | Stolfo |
| 2012/0110674 | A1 | 5/2012 | Belani et al. |
| 2012/0169593 | A1 | 7/2012 | Mak et al. |
| 2012/0218305 | A1 | 8/2012 | Patterson et al. |
| 2012/0254129 | A1 | 10/2012 | Wheeler et al. |
| 2012/0284791 | A1 | 11/2012 | Miller et al. |
| 2012/0330801 | A1 | 12/2012 | McDougal et al. |
| 2013/0019306 | A1 | 1/2013 | Lagar-Cavilla et al. |
| 2013/0097709 | A1 | 4/2013 | Basavapatna et al. |
| 2013/0139268 | A1 | 5/2013 | An et al. |
| 2013/0239217 | A1 | 9/2013 | Kindler et al. |
| 2014/0059683 | A1 | 2/2014 | Ashley |
| 2014/0123279 | A1 | 5/2014 | Bishop et al. |
| 2014/0143009 | A1 | 5/2014 | Brice et al. |
| 2014/0173712 | A1 | 6/2014 | Ferdinand |
| 2014/0173738 | A1 | 6/2014 | Condry et al. |
| 2014/0188895 | A1 | 7/2014 | Wang et al. |
| 2014/0229422 | A1 | 8/2014 | Jain et al. |
| 2014/0229593 | A1* | 8/2014 | Burke ................. H04L 63/20 709/223 |
| 2014/0366132 | A1 | 12/2014 | Stiansen et al. |
| 2015/0039565 | A1 | 2/2015 | Lucas |
| 2015/0128274 | A1 | 5/2015 | Giokas |
| 2015/0188715 | A1 | 7/2015 | Castelluci et al. |
| 2015/0199535 | A1* | 7/2015 | Wilson ................. G06F 21/6218 707/783 |
| 2015/0199625 | A1* | 7/2015 | Jagtap ................. G06Q 10/067 705/348 |
| 2015/0229664 | A1 | 8/2015 | Hawthorn et al. |
| 2015/0248563 | A1 | 9/2015 | Alfarano et al. |
| 2015/0261847 | A1 | 9/2015 | Ducott et al. |
| 2015/0326601 | A1 | 11/2015 | Grondin et al. |
| 2016/0004864 | A1 | 1/2016 | Falk et al. |
| 2016/0028759 | A1 | 1/2016 | Visbal |
| 2016/0203181 | A1* | 7/2016 | Verma ................. G06F 16/245 707/765 |
| 2016/0269373 | A1* | 9/2016 | White ................. H04L 63/10 |
| 2017/0250811 | A1* | 8/2017 | Edwards ................. H04L 9/083 |
| 2017/0250964 | A1* | 8/2017 | Edwards ................. H04L 63/06 |
| 2017/0251022 | A1* | 8/2017 | White ................. G06F 1/324 |
| 2017/0251023 | A1* | 8/2017 | Edwards ................. H04L 63/061 |
| 2017/0359379 | A1* | 12/2017 | Elliot ................. G06F 21/60 |

FOREIGN PATENT DOCUMENTS

| | | |
|---|---|---|
| EP | 1962222 | 8/2008 |
| EP | 2892197 | 7/2015 |
| EP | 2897051 | 7/2015 |
| EP | 2963578 | 1/2016 |
| EP | 2985974 | 2/2016 |
| EP | 3188069 | 7/2017 |
| NL | 2011642 | 8/2015 |
| WO | WO 2005/010685 | 2/2005 |

OTHER PUBLICATIONS

Glaab et al., "EnrichNet: Network-Based Gene Set Enrichment Analysis," Bioinformatics 28.18 (2012): pp. i451-i457.
FireEye, <http://www.fireeye.com/> Printed Jun. 30, 2014 in 2 pages.
Lee et al., "A Data Mining and CIDF Based Approach for Detecting Novel and Distributed Intrusions," Lecture Notes in Computer Science, vol. 1907 Nov. 11, 2000, pp. 49-65.
Schneier et al., "Cryptographic Support for Secure Logs on Untrusted Machines," The Seventh USENIX Security Symposium Proceed- (56) References Cited

OTHER PUBLICATIONS ings, USENIX Press, Jan. 1998, pp. 53-62, https://www.schneier.com/paper-secure-logs.pdf.
FireEye—Products and Solutions Overview, <http://www.fireeye.com/products-and-solutions> Printed Jun. 30, 2014 in 3 pages.
VirusTotal—About, <http://www.virustotal.com/en/about/> Printed Jun. 30, 2014 in 8 pages.
Schneier et al., "Automatic Event Stream Notarization Using Digital Signatures," Security Protocols, International Workshop Apr. 1996 Proceedings, Springer-Veriag, 1997, pp. 155-169, https://schneier.com/paper-event-stream.pdf.
Official Communication for European Patent Application No. 15180985.2 dated Jan. 15, 2016.
Bhuyan et al., "Network Anomaly Detection: Methods, Systems and Tools," First Quarter 2014, IEEE.
Official Communication for European Patent Application No. 14199180.2 dated Aug. 31, 2015.
Official Communication for European Patent Application No. 15175106.2 dated Nov. 5, 2015.
Baker et al., "The Development of a Common Enumeration of Vulnerabilities and Exposures," Presented at the Second International Workshop on Recent Advances in Intrusion Detection, Sep. 7-9, 1999, pp. 35.
Hur et al., "SciMiner: web-based literature mining tool for target identification and functional enrichment analysis," Bioinformatics 25.6 (2009): pp. 838-840.
Waters et al., "Building an Encrypted and Searchable Audit Log," Published Jan. 9, 2004, 11 pages, http://www.parc.com/content/attachments/building_encrypted_searchable_5059_parc.pdf.
Crosby et al., "Efficient Data Structures for Tamper-Evident Logging," Department of Computer Science, Rice University, 2009, pp. 17.
Zheng et al., "GOEAST: a web-based software toolkit for Gene Ontology enrichment analysis," Nucleic acids research 36.suppl 2 (2008): pp. W385-W363.
Ma et al., "A New Approach to Secure Logging," ACM Transactions on Storage, vol. 5, No. 1, Article 2, Published Mar. 2009, 21 pages.
U.S. Appl. No. 14/479,863, filed Sep. 8, 2014, First Office Action Interview, dated Dec. 26, 2014.
U.S. Appl. No. 14/473,860, filed Aug. 29, 2014, Notice of Allowance, dated Jan. 5, 2015.
U.S. Appl. No. 14/223,918, filed Mar. 24, 2014, Office Action, dated Jun. 8, 2015.
U.S. Appl. No. 14/490,612, filed Sep. 18, 2014, First Office Action Interview, dated Mar. 31, 2015.
U.S. Appl. No. 14/490,612, filed Sep. 18, 2014, First Office Action Interview, dated Jan. 27, 2015.
U.S. Appl. No. 15/204,866, filed Jul. 7, 2016, First Office Action Interview, dated Oct. 17, 2016.
U.S. Appl. No. 14/816,748, filed Aug. 3, 2015, First Office Action Interview, dated Apr. 1, 2016.
U.S. Appl. No. 15/204,866, filed Jul. 7, 2016, Notice of Allowance, dated Jun. 28, 2017.
U.S. Appl. No. 14/970,317, filed Dec. 15, 2015, Notice of Allowance, dated May 26, 2016.
U.S. Appl. No. 14/823,935, filed Aug. 11, 2015, Notice of Allowance, dated Apr. 25, 2016.
U.S. Appl. No. 14/816,748, filed Aug. 3, 2015, First Office Action Interview, dated May 24, 2016.
U.S. Appl. No. 14/033,076, filed Sep. 20, 2013, Notice of Allowance, dated Mar. 11, 2016.
U.S. Appl. No. 14/982,699, filed Dec. 29, 2015, First Office Action Interview, dated Mar. 25, 2016.
U.S. Appl. No. 15/204,866, filed Jul. 7, 2016, Notice of Allowance, dated Sep. 20, 2017.
U.S. Appl. No. 14/923,712, filed Oct. 27, 2015, Office Action, dated Feb. 12, 2016.
U.S. Appl. No. 14/970,317, filed Dec. 15, 2015, First Office Action Interview, dated Mar. 21, 2016.
U.S. Appl. No. 14/731,312, filed Jun. 4, 2015, First Office Action Interview, dated Apr. 14, 2016.
U.S. Appl. No. 14/280,490, filed May 16, 2014, First Office Action Interview, dated Jul. 24, 2014.
U.S. Appl. No. 14/823,935, filed Aug. 11, 2015, First Office Action Interview, dated Dec. 4, 2015.
U.S. Appl. No. 14/223,918, filed Mar. 24, 2014, Notice of Allowance, dated Jan. 6, 2016.
U.S. Appl. No. 15/696,094, filed Sep. 5, 2017, Notice of Allowance, dated Mar. 14, 2018.
U.S. Appl. No. 15/696,094, filed Sep. 5, 2017, Office Action, dated Dec. 1, 2017.

* cited by examiner

ACCESS CONTROLS THROUGH NODE-BASED EFFECTIVE POLICY IDENTIFIERS

BENEFIT CLAIM

This application claims the benefit under 35 U.S.C. § 120 as a Continuation of application Ser. No. 15/696,094, filed Sep. 5, 2017, which claims the benefit under 35 U.S.C. 119(e) of provisional application 62/526,955, filed Jun. 29, 2017. The applicants hereby rescind any disclaimer of claim scope in the parent applications or the prosecution history thereof and advise the USPTO that the claims in this application may be broader than any claim in the parent applications.

FIELD OF THE DISCLOSURE

The present disclosure relates to computer-implemented resource management systems. More specifically, the example embodiment(s) described below relate to implementing access controls for resources, such as row-based access controls for a database.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Policy control systems for a large number of resources generally require a method of mapping different policies to different resources and enforcing those policies when a request for resources is received. For instance, if a server computer implements a row-based access control system in a database, the system must be able to respond to a query by a user with only the rows a user is allowed to access.

One method of implementing a policy control system involves post-filtering results of a search query. For instance, after a query is run against a database, the results may be filtered to remove each resource that a user is not allowed to access. While post-filtering is effective at only returning resources a user is allowed to access, post-filtering becomes extremely inefficient in many cases, such as with sparse data. When a user is only allowed to view a relatively small number of rows, applying the post-filtering process could include paging through a large number of identified resources in order to return only a small number of resources. Additionally, post-filtering steps may not be possible when performing aggregations when a user has access to only a limited number of rows.

A second method of implementing a policy control system which is more efficient than post-processing is pre-processing the data repository to determine which resources a user can access and passing data identifying the resources to a query processor as additional elements in a query. One way to accomplish pre-processing of a search query in a hierarchical system is to store a node-based graph where each node identifies a resource and a policy for that resource. When a query is performed, the node-based graph may be traversed to identify each resource that the user requesting the query is allowed to access. Identifiers for each of the resources may then be passed to the query processor.

An inefficiency of passing identifiers of each resource a user is allowed to access to a query processor is that a large number of resources may share the same policy. For instance, a particular folder may contain a thousand documents, each of which contain a null policy. Sending identifiers for each document is inefficient when each document is capable of being treated interchangeably.

In order to reduce the amount of data sent to the query processor as a pre-filter, a server computer may use effective policy identifiers to de-duplicate data being passed to the query processor. In the example of the folder containing a thousand documents, each document may be assigned the same effective policy identifier, thereby allowing only the effective policy identifier to be passed to the query processor instead of identifiers of a thousand documents. The meaning of each effective policy identifier is based on the policies of every resource that is above the assigned resource in a hierarchical system. For instance, any change to the read privileges for a higher-level folder would affect the read privileges of a document in a lower level folder within the higher-level folder.

One difficulty in assigning effective policy identifiers is determining a method of assigning effective policy identifiers that factors in the node's position on the graph and is less susceptible to changes higher up in the node-based graph. For instance, a method of assigning effective policy identifiers could include concatenating the policies of a node and all of its parents, and mapping them to an integer. While this method factors in the node's position on the graph and de-duplicates multiple effective policy identifiers for resources on the same level, it is extremely susceptible to changes higher up in the graph. If a root node is updated, every effective policy mapping for every descendent of that root node would have to be updated and remapped to the associated nodes.

Thus, there is a need for a system that generates effective policy identifiers in a manner that factors in a node's position on a node-based graph while being less susceptible to changes higher up in the node-based graph.

SUMMARY

The appended claims may serve to summarize the disclosure.

DETAILED DESCRIPTION

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure.

Embodiments are described in sections below according to the following outline:
General Overview
System Overview
Effective Policy Identifiers
Null Policies
Enforcing Policy Controls
Updating Nodes
Implementation Example—Hardware Overview
Implementation Example—Basic Software System
Extensions and Alternatives
General Overview Techniques for implementing access controls for resources using a node-based graph are provided. In an embodiment, a server computer stores a node-based graph comprising a plurality of nodes identifying a plurality of resources and corresponding policies. For a particular node, the effective policy identifier is mapped to a value comprising a tuple of the policy of the particular node and an identifier of a parent node to the particular node. The effective policy identifier is then associated with one or more users who may access the particular node associated with the effective policy identifier. When a change is made to a node higher up in the node-based graph, the effective policy identifier for the particular node remains the same, but the data associating one or more users with the effective policy identifier is invalidated until the data can be updated.

In an embodiment, a method comprises storing a node based policy system wherein each node identifies a resource and a policy for the resource; identifying a policy for a first node and an identifier of a second node, wherein the second node is a parent node to the first node; mapping an effective policy identifier to the policy for the first node and the identifier of the second node; storing data associating the effective policy identifier with the first node; identifying a policy for a third node and an identifier of the second node, wherein the second node is a parent node to the third node and wherein the policy for the third node is equivalent to the policy for the first node; storing data associating the effective policy identifier with the third node.

System Overview

Figure 1:
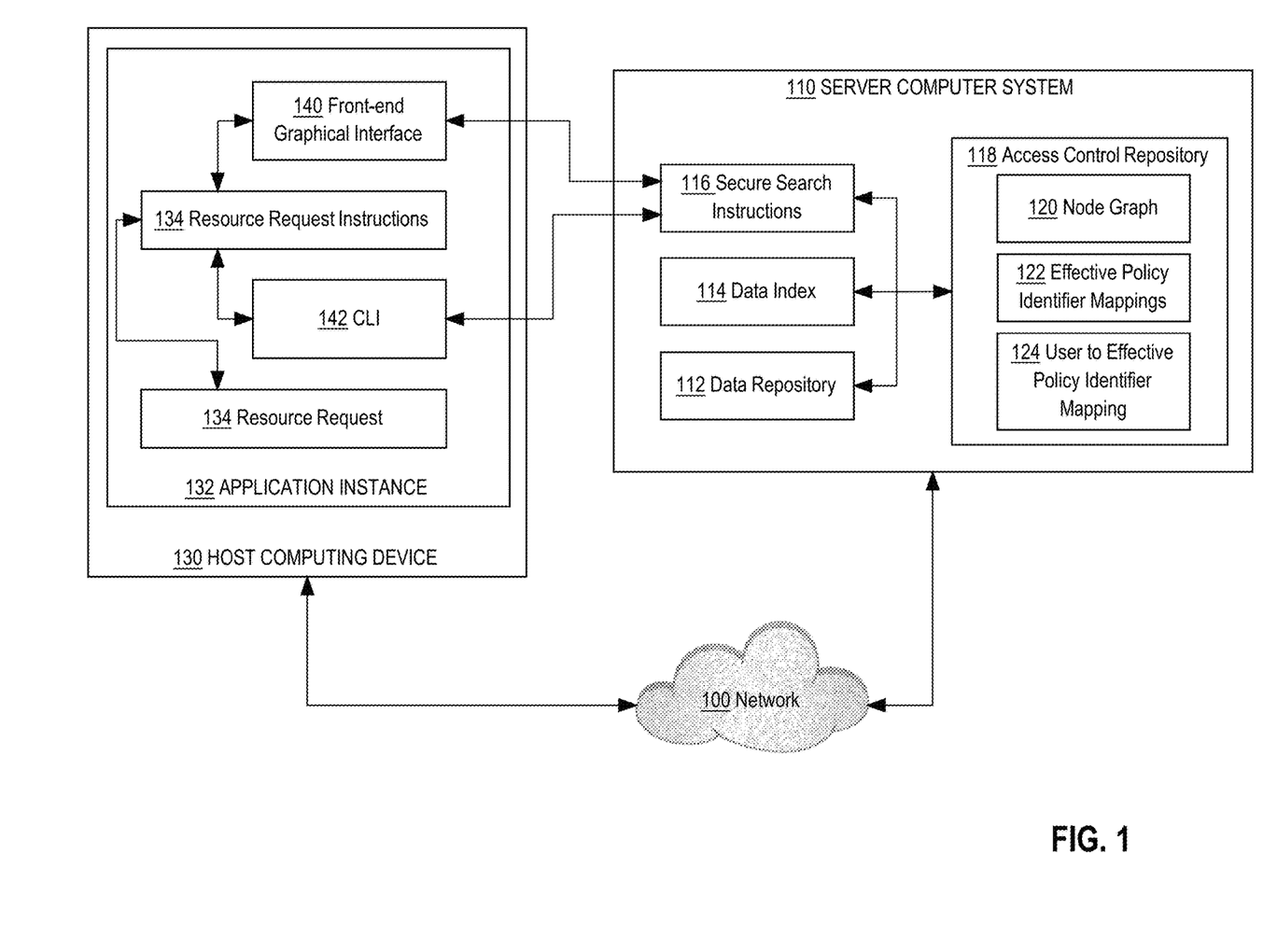
FIG. 1 depicts a schematic diagram of a distributed computing system for performance of secure searches for resources.

FIG. 1 depicts a schematic diagram of a distributed computing system for performance of secure searches for resources.

In an embodiment, a distributed computing system comprises a server computer ("server") 110 coupled via network 100 to a host computing device 130. The distributed computing environment can be within one or more data center, virtual computing facility or other hosting facilities connected to a network such as, for example, the Internet or other network; other embodiments can be within a networked home, office, or campus.

Network 100 broadly represents a combination of one or more local area networks, wide area networks, and/or internetworks and may include the public internet. The network 100 can connect multiple hosts 130 together within the distributed computing environment. Network 100 can be composed of multiple sub-networks connected together. For example, the network 100 can be an Internet Protocol Version 4-based and/or an Internet Protocol Version 6-based wired or wireless network or a combination of multiple such networks.

Host computing device 130 broadly represents one or many computers and the number of hosts 130 in the system at a given time may vary in different embodiments and any number may be used. In an embodiment, a host 130 can be a single computing device such as, for example, the computing device 400 described below with respect to FIG. 4. Alternatively, a host 130 can be a single virtual computer instance that executes on a computing device facilitated by a virtualization layer interposed between the virtual computer instance and the computing device. The virtualization layer can be a virtual machine monitor such as, for example, virtual machine monitor 530 described below with respect to FIG. 5.

Regardless if a single computing device or a single virtual computer instance, a host 130 can be configured with an operating system such as, for example, operating system 510 described below with respect to FIG. 5. The operating system of a host 130 can manage low-level aspects of the host's operation including managing execution of processes, memory allocation, file input and output (I/O), and device I/O. Furthermore, the operating system of host 130 may manage presentation systems such as a windowed graphical user interface (GUI) and driving a computer display device such as a flat screen display or CRT. A host 130 may also be configured with a container system (e.g. the DOCKER container system) for running services within containers on the host's operating system.

Services that execute as processes on hosts in the distributed computing environment may be configured using the distributed configuration platform described herein or in application Ser. No. 15/284,959, filed Oct. 4, 2016, the entire contents of which is hereby incorporated by reference as if fully set forth herein.

In an embodiment, host 130 comprises an application instance 132 which allows one or more services to be deployed on host 130 from one or more server computing devices, such as server 110. In an embodiment, application instance 132 comprises resource request instructions 134, a front-end graphical interface 140 and a command-line interface (CLI) 142 that may interoperate to provide the functions that are described further herein. In an embodiment, the front-end interface 140 and CLI 142 are programmed or configured to interact with one or more server-side functional units of server computer 110 as further described. Host computing device 130 also manages one or more resource requests 136 using processes that are further described in other sections.

A service that application instance 132 facilitates or hosts can be a single instance of a software product or software application installed on at least one of the hosts 130. For example, a service might be a database server instance, a web server instance, or any other instance of a software product or a software application installed on one or more of the hosts 130. Multiple different services may be installed on the hosts 130 including multiple different services on the same host 130. For example, a service may be installed on multiple of the hosts 130 in a distributed, clustered, load balanced, or failover computing arrangement.

In an embodiment, server 110 comprises data repository 112, data index 114, secure search instructions 116, and an access control repository 118 comprising a node graph 120, effective policy identifier mappings 122, and a user to effective policy identifier mapping 124 as further described. In another embodiment, the access control repository 118 may be stored in a separate server computer system. In an embodiment, secure search instructions 116, when executed by one or more processors, are programmed or configured to cause server computer system 110 to receive electronic digital messages that define database operations according to a structured query language, parse the messages to determine the operations, and execute the operations. Typically, execution of the operations causes instructing one or more worker processes to execute builds of derived datasets, based on raw datasets, with data repository 112 and/or data index 114. In one implementation, secure search instructions 116 comprises an executable instance of ELASTICSEARCH and/or a software layer in conjunction with ELASTICSEARCH.

In an embodiment data repository 112 comprises a distributed data storage system which stores one or more resources. The resources may comprise one or more of individual documents, folders, JSON blobs, rows in a database, user comments or flags, media files, build artifacts, and/or any other digital resource. Data index 114 includes an index of datasets and/or other resources from data repository 112. Data index 114 may be a distributed index for more efficient searches. Secure search instructions 116 may comprise instructions which, when executed by one or more processors, cause server computer system 110 to perform a search of data repository 112 and/or data index 114 for individual resources while implementing access controls to restrict resources received by a requesting computing device.

Access control repository 118 comprises one or more access control policies to be applied to data repository 112 and/or data index 114 during performance of a search. For example, access control repository 118 may implement row-level access controls on data in a database. Access control repository 118 comprises node graph 120, effective policy identifier mappings 122, and user to effective policy identifier mapping 124. Node graph 120 comprises a plurality of nodes, each of which represent a resource and comprise a policy for that resource. Effective policy identifier mappings 122 include mappings of effective policy identifiers (EPIDs) to data that identifies one or more nodes. User to effective policy identifier mapping 124 comprises data identifying one or more users and one or more EPIDs that are accessible to the one or more users. The users may be identified by individual user identifications, role identifications, and/or user group identifications.

In an embodiment, each of secure search instructions 116, data index 114, data repository 112, and access control repository 118 comprises a set of one or more pages of main memory, such as RAM, in the server 110 into which executable instructions have been loaded and which when executed cause the server to perform the functions or operations that are described herein with reference to those modules. For example, the secure search instructions 116 may comprise a set of pages in RAM that contain instructions which when executed cause performing the secure search functions that are described herein.

The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture.

In another embodiment, each of secure search instructions 116, data index 114, data repository 112, and access control repository 118 also may represent one or more files or projects of source code that are digitally stored in a mass storage device such as non-volatile RAM or disk storage, in the server 110 or a separate repository system, which when compiled or interpreted cause generating executable instructions which when executed cause the server 110 to perform the functions or operations that are described herein with reference to those modules. In other words, the drawing figure may represent the manner in which programmers or software developers organize and arrange source code for later compilation into an executable, or interpretation into bytecode or the equivalent, for execution by the server 110.

Effective Policy Identifiers

Figure 2:
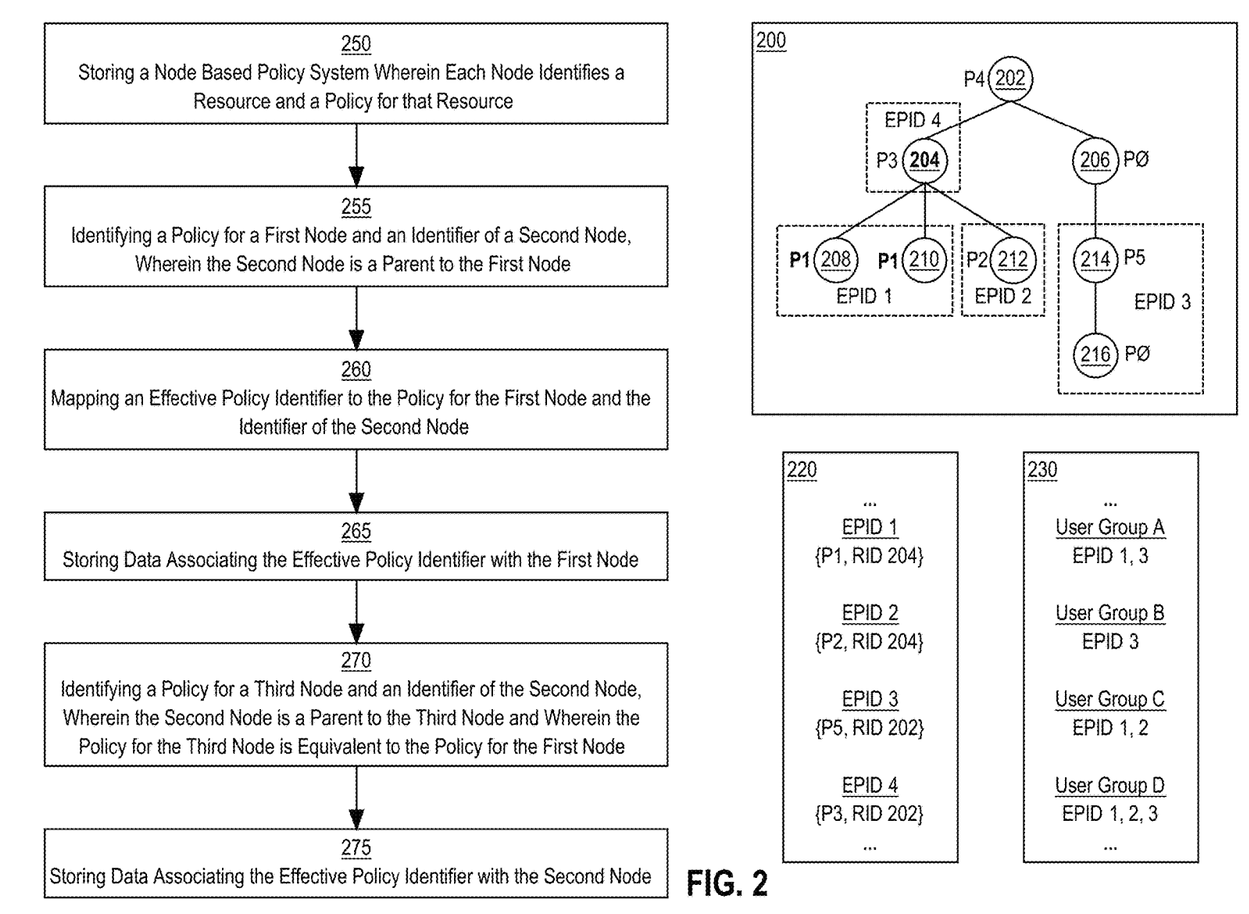
FIG. 2 depicts an example method for generating effective policy identifiers for nodes in a node based policy system.

FIG. 2 depicts an example method for generating effective policy identifiers for nodes in a node based policy system.

Figure 3:
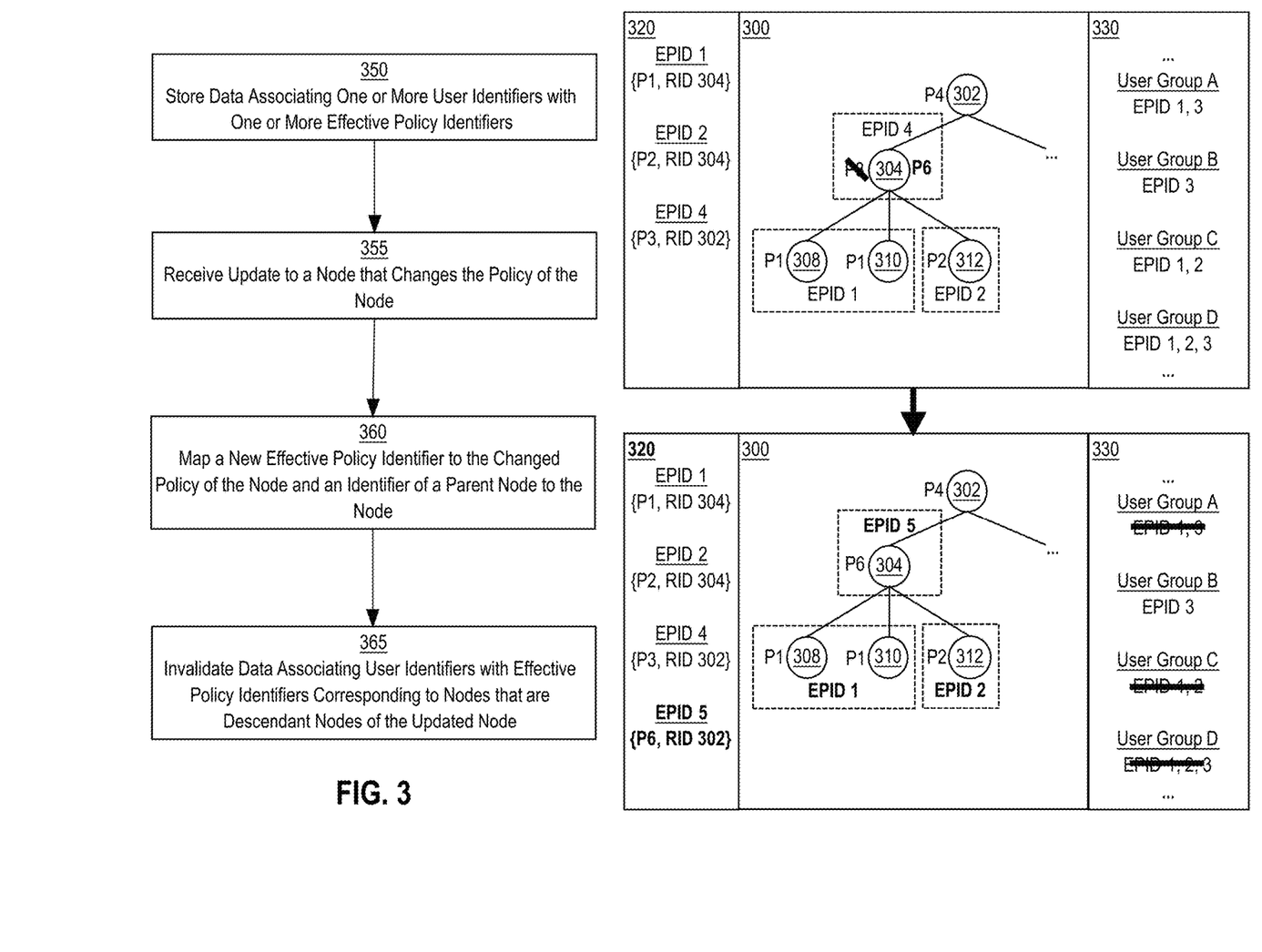
FIG. 3 depicts a method for updating nodes in a node based policy system.

Each of FIG. 2, FIG. 3 and any other flow diagram or process description in this disclosure is intended to represent an algorithm or plan for programming computer programs at the same level of detail that skilled persons in this field use to communicate among themselves about the architecture, process or data flow, arrangement, ordering and content of similar computer programs of similar types. That is, the flow diagrams and process descriptions are presented at a level of detail that skilled persons in this field have determined to be sufficient to communicate between themselves the baseline information that is adequate to permit the coding, completion, testing and deployment of computer programs that will execute and operate to provide the functions that are described herein.

At block 250, a node based policy system is stored wherein each node identifies a resource and a policy for that resource. For example, a server computer may store a graph of nodes where each node identifies a resource stored in the server computer. Each node may comprise a resource identifier which is mapped to a resource corresponding to the node. The node may additionally comprise a policy identifier which indicates a policy for that node. For example, a particular resource may have a read-only policy for a particular group of users. Thus, the node may have a policy identifier that indicates a read-only policy for the particular group of users. Additionally and/or alternatively, the policy may be stored with the resource that is identified by the node.

The resources may include one or more of individual documents, folders, JSON blobs, rows in a database, user comments or flags, media files, build artifacts, and/or any other digital resource. Additionally, resources may be stored in a hierarchical format. For example, a first resource may be a folder while a second resource is an item within the folder. The item within the folder may inherit all of the policies of the folder in addition to any particular policies for the item. As another example, rows may be stored in a database in a hierarchical format, such that a row inherits the policies of a parent row.

Graph 200 depicts an example of a graph of nodes where each node identifies a resource and a policy for that resource. Node 202 comprises policy P4. Node 204 is a child of node 202 and comprises policy P3. Node 204 has three children nodes, node 208, node 210, and node 212. Nodes 208 and 210 comprise policy P1 and node 212 comprises policy P2. Node 202, in the example of FIG. 2 is referred to as the root node as it is a node with children nodes and grandchildren nodes, but no parent nodes. As node 208 is a descendent of root node 202, any changes to the policy of node 202 may affect the policy applied to node 208.

At block 255, a policy for a first node and an identifier of a second node is identified, wherein the second node is a parent to the first node. The policy may be identified using a policy identifier associated with the node. The identifier of the second node may be any method of identifying the resource. For example, the identifier may be a row identifier (RID) of a row in a database, a resource identifier assigned to each resource in graph 200, a policy associated with a resource, a name or address of a file or folder, or any other identifier that can be used to identify the node and/or resource.

As an example, for node 208, the system may identify the policy associated with node 208, P1, and an identifier of the parent node 204. For node 212, the system may identify the policy associated with the node, P2, and the same identifier of the parent node 204 as was used for node 208. In other embodiments, the system may identify the policy of a node and the policy of the parent node. Thus, for node 208, the system may identify the policy associated with node 208, P1, and the policy associated with parent node 204, P3.

At block 260, an effective policy identifier (EPID) is mapped to the policy for the first node and the identifier of the second node. An EPID may be an integer, character, or other value which is mapped to a tuple of the policy of the node and an identifier of the parent node. As an example, effective policy identifier mapping 220 includes a plurality of different effective policy identifiers, each of which are mapped to a policy identifier and an RID of a parent node to a node that has that policy identifier. EPID 1 in effective policy identifier mapping 220 is mapped to the tuple of policy P1 and the RID of node 204, the parent node of nodes 208 and 210.

Each combination of policy identifier and parent node identifier receives a unique EPID. For example, even if node 206 had the policy of P1, the EPID of node 206 would still differ from the EPIDs of nodes 208 and 210 regardless of the fact that nodes 206, 208, and 210 would have the same policy. Additionally, because node 212 comprises policy P2 and not policy P1, node 212 receives a different EPID than nodes 208 and 210 regardless of the fact that nodes 208, 210, and 212 have the same parent node.

At block 265, data associating the effective policy identifier with the first node is stored. The effective policy identifier may be stored in the node graph, stored with the individual resources, and/or stored in a separate file and/or data repository. As an example, each row of a database may include a value in a column for the EPID. As another example, a data index may store EPIDs for each item identified within the index. Thus, an index may identify a plurality of rows, each of which are associated with an EPID. By storing the EPIDs in an index, a server computer may use the EPIDs as an additional filter to a query.

At block 270, a policy for a third node and an identifier of the second node is identified, wherein the second node is a parent to the third node and wherein the policy for the third node is equivalent to the policy for the first node. In the example graph 200, the first node may be node 208 which has a policy of P1 and a parent node 204 and the third node may be node 210 which has the same policy of P1 and the same parent node 204.

By using the policy of a node along with an identifier of a parent node as the effective policy identifier, the server computer de-duplicates effective policy identifiers, thereby reducing the number of effective policy identifiers that need to be stored. For example, if node 204 represented a folder with one hundred documents in it, each of which contained the same policy, each document would also have the same effective policy identifier. Additionally, documents in a different folder with the same policy would have a different policy identifier, thereby allowing the effective policy identifiers for each set of documents to be updated easier when a change is made to a higher-level folder.

At block 275, data associating the effective policy identifier with the second node is stored. As described above, the effective policy identifier may be stored in the node graph, stored with the individual resources, and/or stored in a separate file and/or data repository.

Null Policies

In an embodiment, the server computer additionally de-duplicates effective policy identifiers by traversing up the node graph when a null policy is detected. For example, if a particular node contains a null policy, the server computer may determine whether the parent of the particular node contains a null policy. If the parent contains a null policy, the server computer may continue traversing the node graph through the parents until a node is identified with a non-null policy. If the parent contains a non-null policy, the server computer may identify the effective policy identifier as a tuple of the policy of the parent node and an identifier of a node that is a parent of the parent node. Thus, the particular node and the parent node will have the same effective policy identifier.

In an embodiment, the server computer only uses identifiers of parent nodes that have a non-null policy. Thus, if a particular node has a non-null policy, but the parent of the particular node has a null policy, the server computer may identify the effective policy identifier as a tuple of the policy of the particular node and an identifier of a node that is a parent of the parent node. If the parent node to the parent node additionally comprises a null policy, the server computer may continue traversing the node graph through the parents until a node is identified with a non-null policy. An identifier of the identified node may then be used as the parent identifier portion of the mapping for the EPID. This method of using only parent nodes which contain non-null policies allows for de-duplication across nodes with different parent nodes, each of which contain a null policy.

In an embodiment, the server computer combines the two methods of traversing nodes until a node with a non-null policy is identified. As an example, in graph 200 of FIG. 2, node 216 has a null policy. Node 214, which is a parent of node 216, has a policy P5. Thus, for node 216, the policy portion of the tuple is the same as the policy portion for node 214, i.e. P5. Additionally, the parent of node 214 is node 206 which also has a null policy. Thus, for the node identifier portion of the tuple, the server computer traverses the graph to node 202 which has the non-null policy of 202. EPID 3 is mapped to the policy P5 of node 214 and an identifier of node 202. Thus, in effective policy identifier mapping 220, EPID 3 is identified as {P5, RID 202}. The server computer may then store data associating EPID 3 with both of nodes 214 and 216.

Enforcing Policy Controls

In an embodiment, the server computer uses the EPIDs to pre-filter resources in response to a query from a host computing device. For example, host computing device 130 may generate resource request 136 from application instance 132. The request may identify one or more resources or one or more requisites for a resource. For example, a host computing device may request all rows from a database where a cost of a product exceeds fifty dollars. If the server computer system is implementing a row-based access control system, the server computer may use the node graph to first determine which rows the host computing device may access. The server computer may then pass the data identifying rows the host computing device may access to a search application as a second filter for searching the database. Thus, in the present example, the query may be modified to request all rows from the database where a cost of a product exceeds fifty dollars and where the EPIDs of the row matches an EPID the host computing device can access.

In an embodiment, the server computer stores a user to effective policy identifier mapping such as mapping 230 in FIG. 2. Mapping 230 includes a plurality of identifiers of user groups. User groups may comprise individual user identifiers, groups of multiple user identifiers, role identifiers in a role based access control system, and/or any other method of implementing an access control system which varies between users. The identifiers of user groups are accompanied by data identifying which EPIDs of resources a user group can access. While FIG. 2 depicts a mapping sorted by user group, the present method may additionally be implemented with a mapping that identifies, for each EPID of a plurality of EPIDs, one or more user groups that have access to resources associated with the EPID.

In the example of FIG. 2, if a query is received from a user in User Group A, the system may identify, in mapping 230, that user group A has access to nodes with EPIDs 1 and 3. In an embodiment, the system passes EPIDs 1 and 3 to a search application as additional requisites for the query. Thus, the final query may comprise the initial query along with one or more EPIDs such that only rows with the one or more EPIDs are returned to the host computing device.

Updating Nodes

By basing the EPIDs on the policy of the node and an identifier of a parent node, the server computer reduces the cost of updating a root node or another high-level node. Instead of remapping new EPIDs to each node, the server computer may keep most of the same EPIDs and merely update the mapping of user identifiers to EPIDs.

FIG. 3 depicts a method for updating nodes in a node based policy system.

At step 350, data associating one or more user identifiers with one or more effective policy identifiers is stored. For example, the graph 300 may comprise a plurality of nodes, each of which identifies a resource and a policy for the resource. Based on the policy of each resource and an identifier of a parent node of a node associated with the resource, an EPID may be generated. As an example, mapping 320 comprises a plurality of EPIDs, each of which comprise a tuple of a policy of one or more nodes and a row identifier of a parent node to the one or more nodes. Data identifying which users may access resources with particular EPIDs may be stored in mapping 330. For example, Mapping 330 comprises a plurality of user groups and data identifying which EPIDs may be accessed by each of the user groups.

At step 355, an update to a node that changes the policy of the node is received. For example, the server computer may receive a request from a host computing device to update one or more resources. The server computer may determine that the update changes a policy for the node based on one or more policy rules. Additionally or alternatively, the update may be a direct update to the policy of the node. The server computer may apply the update to the node based graph. For example, in FIG. 300, the server computer updates node 304 by replacing policy P3 with policy P6.

At step 360, a new effective policy identifier is mapped to the changed policy of the node and an identifier of a parent node to the node. For example, after the update to node 304 in graph 300, EPID 4 no longer applies to node 304 due to the fact that in mapping 320 EPID is mapped to policy P3 and the resource corresponding to node 304 no longer has the policy P3. Thus, a new EPID, EPID 5, is mapped to the new policy of node 304, policy P6, and the row identifier of the parent node. The resource associated with node 304 may then be updated to identify EPID 5.

Although the number of users who can access resources associated with nodes 308, 310, and 312 may be affected by the change to node 304, the EPID of nodes 308, 310, and 312 are not changed based on the update to node 304. As an example, EPID 1 is still mapped to {P1, RID 304} as the policy for nodes 308 and 310 is still P1 and the parent node of the two nodes is still node 304. In embodiments where the EPIDs are stored with the resource, such as in a column of each row, the minimized change of EPIDs minimizes the number of resources for the server computer to update. In the example of FIG. 3, only the EPID data stored with the resource associated with node 304 would have to be updated.

At step 365, data associating user identifiers with effective policy identifiers corresponding to nodes that are descendent nodes of the updated node is invalidated. In the example of FIG. 3, while the EPIDs for nodes 308, 310, and 312 have not been changed based on the update to node 304, the update to node 304 may still affect which users can access the resources associated with nodes 308, 310, and 312. For example, policy P6 may indicate that only users in User Group C may access the resource associated with node 304. While EPID 1 and EPID 2 are unchanged and still apply to the same nodes, EPID 1 and EPID 2 would no longer be accessible to User Group A and User Group D. Thus, in response to an update to node 304, data in mapping 330 identifying which users may access EPID 1 and EPID 2 is invalidated. Invalidating data in mapping 330 may comprise storing data indicating that particular user group to EPID mappings are no longer valid.

In an embodiment, the server computer additionally updates invalidated data in mapping 330 based on the new policy. For example, if P6 was updated to indicate that only users in User Group C may access the resource associated with node 304, the server computer may remove EPID 1 from the list of EPIDs that User Group A may access and EPIDs 1 and 2 from the list of EPIDs that User Group D may access.

By invalidating the data in mapping 330, the server computer assures that users running queries after a change to a node but before an update to mapping 330 are unable to receive resources that they are not supposed to be able to access. Additionally, by inferring a prior state of the graph, the server computer may respond to requests in a manner that maintains consistency between the datastore state and the graph state.

While FIG. 3 depicts all EPIDs being crossed out from User Groups A, C, and D, in an embodiment only the data identifying EPIDs of nodes that are descendants of the updated node is invalidated. Thus, after the invalidation but prior to the update, users in User Group A may still have access to resources associated with EPID 3. As described above, an additional or alternative mapping to mapping 330 identifies a plurality of EPIDs and one or more users who may access resources associated with each EPID. In the additional or alternative mapping, data associated with each EPID affected by the update to the parent nodes may be invalidated prior to the update to the mapping.

While FIG. 3 only depicts the direct children of node 304 being affected by the updated, in an embodiment, data associating user identifiers with effective policy identifiers corresponding to any descendent nodes of the updated node may be invalidated. For example, if the policy of node 302 was updated instead the policy of node 302, data associating EPIDs 1, 2, and 4 with one or more users may be invalidated until an update of mapping 330 is performed.

Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
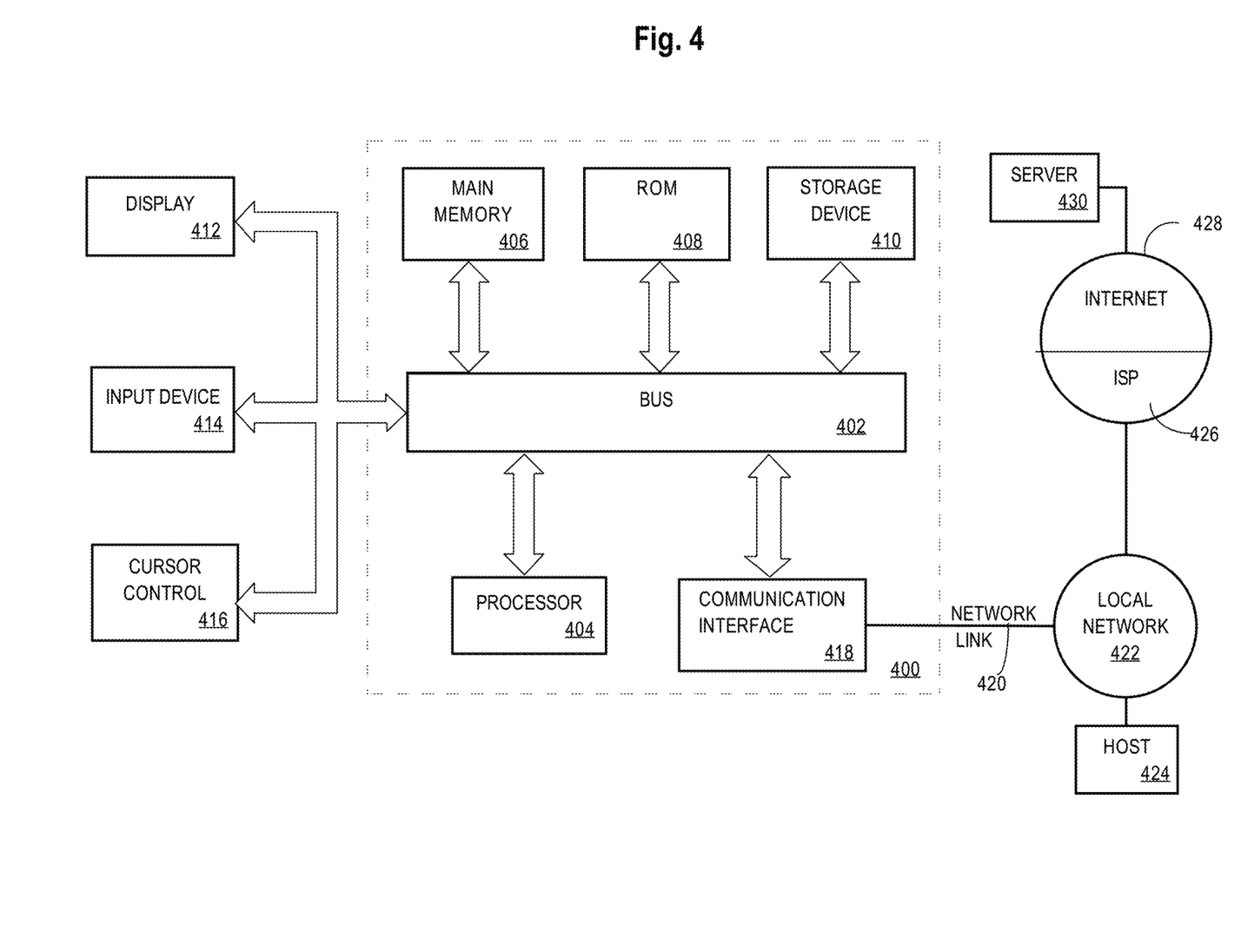
FIG. 4 is a block diagram that illustrates a computer system upon which an embodiment may be implemented.

For example, FIG. 4 is a block diagram that illustrates a computer system 400 upon which an embodiment may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Implementation Example—Basic Software System

Figure 5:
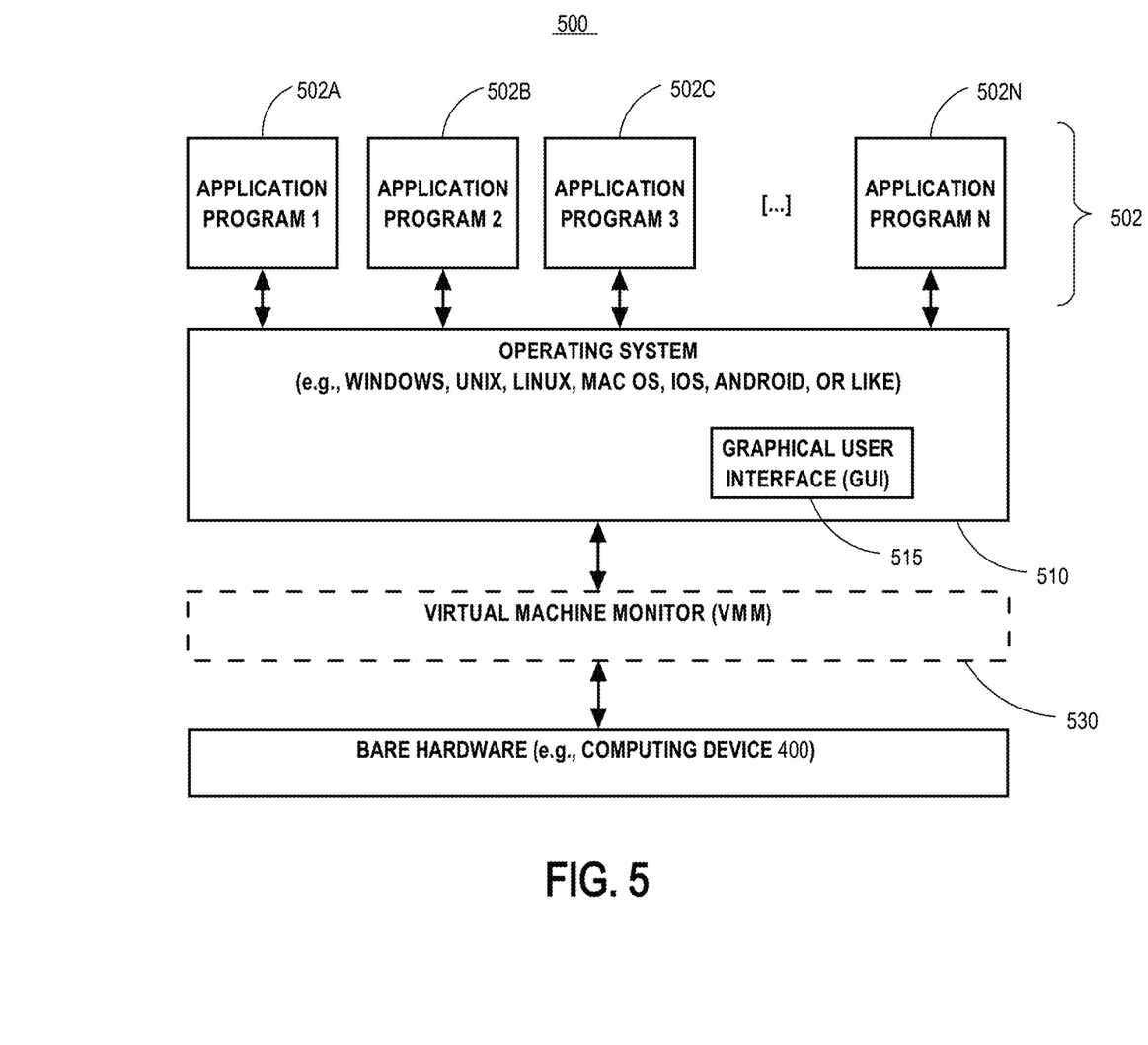
FIG. 5 is a block diagram of a basic software system that may be employed for controlling the operation of a computing device.

FIG. 5 is a block diagram of a basic software system 500 that may be employed for controlling the operation of computing device 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing device 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on device 500 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of device 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the device 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of device 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

The above-described basic computer hardware and software is presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Extensions and Alternatives

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A data processing method comprising:
   receiving an update to a first node that changes a policy of the first node, the first node initially comprising an effective policy identifier mapped to the policy of the first node and an identifier of a second node that is a parent node of the first node;
   in response to receiving the update, generating a new effective policy identifier for the changed policy of the first node and the identifier of the second node;
   invalidating data associating user identifiers with effective policy identifiers corresponding to nodes that are descendant nodes of the first node.

2. The method of claim 1, further comprising:
   identifying a policy for a third node and an identifier of the second node, wherein the second node is a parent node to the third node and wherein the policy for the third node is equivalent to the policy for the first node;
   in response to the second node being a parent node to the third node and the policy for the third node being equivalent to the policy for the first node, storing data associating the effective policy identifier with the third node.

3. The method of claim 1, further comprising:
   storing data associating one or more user identifiers with the effective policy identifier;

receiving a request for a particular resource identified by the first node from a client computing device, wherein the request includes a particular user identifier;

determining that the one or more user identifiers include the particular user identifier;

in response to determining, responding to the request for the particular resource with the particular resource.

4. The method of claim 1, further comprising:

identifying a null policy for a third node;

in response to identifying the null policy for the third node, traversing through one or more parent nodes of the third node until a particular node is identified with a non-null policy;

mapping a second effective policy identifier to the policy for the particular node and an identifier of a fourth node, wherein the fourth node is a parent node of the particular node;

storing data associating the second effective policy identifier with the third node.

5. The method of claim 1, further comprising:

identifying a policy for a third node;

identifying a null policy for a fourth node, wherein the fourth node is a parent of the fourth node;

in response to identifying the null policy for the fourth node, traversing through one or more parent nodes of the fourth node until a particular node is identified with a non-null policy;

mapping a second effective policy identifier to the policy for the third node and an identifier of the particular node;

storing data associating the second effective policy identifier with the third node.

6. The method of claim 1, further comprising:

identifying a null policy for a third node;

in response to identifying the null policy for the third node, traversing through one or more parent nodes of the third node until a first particular node is identified with a non-null policy;

identifying a null policy for a fourth node, wherein the fourth node is a parent of the first particular node;

in response to identifying the null policy for the fourth node, traversing through one or more parent nodes of the fourth node until a second particular node is identified with a non-null policy;

mapping a second effective policy identifier to the policy for the first particular node and an identifier of the second particular node;

storing data associating the second effective policy identifier with the fourth node.

7. A system comprising:

one or more processors;

one or more storage media;

one or more instructions stored in the storage media which, when executed by the one or more processors, cause performance of:

receiving an update to a first node that changes a policy of the first node, the first node initially comprising an effective policy identifier mapped to the policy of the first node and an identifier of a second node that is a parent node of the first node;

in response to receiving the update, generating a new effective policy identifier for the changed policy of the first node and the identifier of the second node;

invalidating data associating user identifiers with effective policy identifiers corresponding to nodes that are descendant nodes of the first node.

8. The system of claim 7, wherein the instructions, when executed by the one or more processors, further cause performance of:

identifying a policy for a third node and an identifier of the second node, wherein the second node is a parent node to the third node and wherein the policy for the third node is equivalent to the policy for the first node;

in response to the second node being a parent node to the third node and the policy for the third node being equivalent to the policy for the first node, storing data associating the effective policy identifier with the third node.

9. The system of claim 7, wherein the instructions, when executed by the one or more processors, further cause performance of:

storing data associating one or more user identifiers with the effective policy identifier;

receiving a request for a particular resource identified by the first node from a client computing device, wherein the request includes a particular user identifier;

determining that the one or more user identifiers include the particular user identifier;

in response to determining, responding to the request for the particular resource with the particular resource.

10. The system of claim 7, wherein the instructions, when executed by the one or more processors, further cause performance of:

identifying a null policy for a third node;

in response to identifying the null policy for the third node, traversing through one or more parent nodes of the third node until a particular node is identified with a non-null policy;

mapping a second effective policy identifier to the policy for the particular node and an identifier of a fourth node, wherein the fourth node is a parent node of the particular node;

storing data associating the second effective policy identifier with the third node.

11. The system of claim 7, wherein the instructions, when executed by the one or more processors, further cause performance of:

identifying a policy for a third node;

identifying a null policy for a fourth node, wherein the fourth node is a parent of the fourth node;

in response to identifying the null policy for the fourth node, traversing through one or more parent nodes of the fourth node until a particular node is identified with a non-null policy;

mapping a second effective policy identifier to the policy for the third node and an identifier of the particular node;

storing data associating the second effective policy identifier with the third node.

12. The system of claim 7, wherein the instructions, when executed by the one or more processors, further cause performance of:

identifying a null policy for a third node;

in response to identifying the null policy for the third node, traversing through one or more parent nodes of the third node until a first particular node is identified with a non-null policy;

identifying a null policy for a fourth node, wherein the fourth node is a parent of the first particular node;

in response to identifying the null policy for the fourth node, traversing through one or more parent nodes of the fourth node until a second particular node is identified with a non-null policy;

mapping a second effective policy identifier to the policy for the first particular node and an identifier of the second particular node;

storing data associating the second effective policy identifier with the fourth node.

13. One or more non-transitory computer-readable media storing instructions which, when executed by one or more processors, cause performance of:

receiving an update to a first node that changes a policy of the first node, the first node initially comprising an effective policy identifier mapped to the policy of the first node and an identifier of a second node that is a parent node of the first node;

in response to receiving the update, generating a new effective policy identifier for the changed policy of the first node and the identifier of the second node;

invalidating data associating user identifiers with effective policy identifiers corresponding to nodes that are descendant nodes of the first node.

14. The one or more non-transitory computer-readable media of claim 13, wherein the instructions, when executed by the one or more processors, further cause performance of:

identifying a policy for a third node and an identifier of the second node, wherein the second node is a parent node to the third node and wherein the policy for the third node is equivalent to the policy for the first node;

in response to the second node being a parent node to the third node and the policy for the third node being equivalent to the policy for the first node, storing data associating the effective policy identifier with the third node.

15. The one or more non-transitory computer-readable media of claim 13, wherein the instructions, when executed by the one or more processors, further cause performance of:

storing data associating one or more user identifiers with the effective policy identifier;

receiving a request for a particular resource identified by the first node from a client computing device, wherein the request includes a particular user identifier;

determining that the one or more user identifiers include the particular user identifier;

in response to determining, responding to the request for the particular resource with the particular resource.

16. The one or more non-transitory computer-readable media of claim 13, wherein the instructions, when executed by the one or more processors, further cause performance of:

identifying a null policy for a third node;

in response to identifying the null policy for the third node, traversing through one or more parent nodes of the third node until a particular node is identified with a non-null policy;

mapping a second effective policy identifier to the policy for the particular node and an identifier of a fourth node, wherein the fourth node is a parent node of the particular node;

storing data associating the second effective policy identifier with the third node.

17. The one or more non-transitory computer-readable media of claim 13, wherein the instructions, when executed by the one or more processors, further cause performance of:

identifying a policy for a third node;

identifying a null policy for a fourth node, wherein the fourth node is a parent of the fourth node;

in response to identifying the null policy for the fourth node, traversing through one or more parent nodes of the fourth node until a particular node is identified with a non-null policy;

mapping a second effective policy identifier to the policy for the third node and an identifier of the particular node;

storing data associating the second effective policy identifier with the third node.

18. The one or more non-transitory computer-readable media of claim 13, wherein the instructions, when executed by the one or more processors, further cause performance of:

identifying a null policy for a third node;

in response to identifying the null policy for the third node, traversing through one or more parent nodes of the third node until a first particular node is identified with a non-null policy;

identifying a null policy for a fourth node, wherein the fourth node is a parent of the first particular node;

in response to identifying the null policy for the fourth node, traversing through one or more parent nodes of the fourth node until a second particular node is identified with a non-null policy;

mapping a second effective policy identifier to the policy for the first particular node and an identifier of the second particular node;

storing data associating the second effective policy identifier with the fourth node.

* * * * *